United States Patent [19]

Stillman

[11] Patent Number: 5,160,488
[45] Date of Patent: Nov. 3, 1992

[54] BIOREMEDIATION YEAST AND SURFACTANT COMPOSITION

[75] Inventor: Neil W. Stillman, Mesa, Ariz.

[73] Assignee: H₂O Chemists, Inc., Gilbert, Ariz.

[21] Appl. No.: 583,378

[22] Filed: Sep. 14, 1990

[51] Int. Cl.⁵ .................. A23L 1/202; C12N 1/18; D06M 16/00; C02F 3/00
[52] U.S. Cl. .................. 435/262.5; 435/185; 435/256; 435/264; 210/610
[58] Field of Search ............ 435/185, 255, 256, 262, 435/264, 171, 183, 262.5; 210/610, 632

[56] References Cited

U.S. PATENT DOCUMENTS 3,635,797  1/1972  Battistoni et al. .................. 435/264

OTHER PUBLICATIONS

McCutcheon's, Emulsifiers and Detergents, North American Edition, pp. 260 and 267, 1982.

*Primary Examiner*—Douglas W. Robinson
*Assistant Examiner*—T. J. Reardon
*Attorney, Agent, or Firm*—Reinhart, Boerner et al.

[57] ABSTRACT

A chemical product and method for accelerated biodegradation of petroleum on water. The chemical product includes a fermentation product portion and a surfactant containing emulsifier portion which has a monosodium glutamate additive.

1 Claim, No Drawings

BIOREMEDIATION YEAST AND SURFACTANT COMPOSITION

The present invention is concerned generally with a product for bioremediation of polluted water and soil, including biodegradation of petroleum products contaminating the environment. More particularly, the invention is concerned with an enzymatic product for biodegradation of petrolum porducts contaminating soil and the surface of water and also for bioremediation and enhancement of soil condition to support healthy plant growth.

Pollution of the environment, particularly degradation and contamination of water and soil, results in extraordinary damage to the environment and attendant loss of vitality and productivity. Such pollution and general degradation also causes enormous economic losses to fishing, farming and tourist industries. Moreover, with the advent of protective environmental laws and the Super Fund, fines and lawsuits can lead to substantial economic losses to polluters. The occurrence of large scale petroleum pollution is a frequent occurrence, and a number of potential solutions for bioremediation of petroleum pollution have been tried or proposed. For example, current cleanup practices include: 1) physical removal of the polluting petroleum by use of absorption media, 2) dispersal using detergents, 3) burning, 4) microbial degradation under ideal certain conditions, 5) agglomeration of oil on water and sinking to the floor of the water body, and 6) use of organic chemicals, such as kerosene based dispersants, to dissolve and disperse the oil. All of these methodologies are quite expensive to use and have very limited usefulness. Further, even under ideal conditions these methods are often hazardous to carry out and extremely difficult to use to effectively clean up the pollution. In general therefore, bioremediation of soil and water are extremely difficult and expensive tasks.

It is therefore an object of the invention to provide an improved product and method of bioremediation of petroleum polluted soil and water.

It is another object of the invention to provide a new product and method for accelerating the safe biodegradation of petroleum pollutants.

It is a further object of the invention to provide improved products and methods for general bioremediation of soil, including the improvement of soil condition to enhance the ability of soil to support vital plant growth.

DETAILED DESCRIPTION OF PREFERRED EMBODIMENTS

Compositions prepared in accordance with the invention include mixtures of fermentation composition combined with another separate enzymatic mixture to form a material for accelerating biodegradation of petroleum products polluting water or contaminating soil.

The fermentation composition comprises a mixture of the following preferred ingredients:

| Ingredient* | Wt. Percentage Range |
|---|---|
| water | 88-92 |
| molasses (from raw sugar) | 6-8 |
| unprocessed sugar | 2-3 |
| malt (barley) | 0.5-1.5 |
| yeast (baker's dry) | 0.05-0.2 |
| preferred yeast/malt ratio | 8:1 to 12:1 |

*The listed components are readily available, conventional materials. For example, see the components listed in U.S. Pat. No. 3,404,068 which is incorporated by reference herein.

These ingredients can be mixed together in a container by stirring at a moderate speed. The yeast can be predissolved in warm water and dissolved in the mixture. The malt will likely not dissolve totally and will settle out during the fermentation process, which takes about 5-7 days depending on the temperature of the mixture. The undissolved malt can be filtered out prior to use of the fermentation product, either as a soil bioremediation product or as one of a two component mixture for forming a combined different product for accelerating biodegradation of petroleum products contaminating soil or the surface of water.

ENZYMATIC OIL DEGRADATION PRODUCT

The fermentation product described above can be used as one of a two component mixture which is mixed to form a new product for accelerating biodegradation of petroleum contaminants in soil or on the surface of water. In a contemporaneously filed application (entitled "Soil Bioremediation Enzymatic Composition", incorporated by reference herein) the fermentation product can also be used as a soil conditioner. In a first phase of preparation, the fermentation product is obtained in the manner described above and then mixed with a second mixture comprising the following preferred ingredients:

| Ingredient | Wt. Percentage (after combining with fermentation) product) |
|---|---|
| water | 83-88* |
| TERGITOL (a trademark of Union Carbide Corporation) (15-S-9 nonionic ethoxylated secondary alcohol 8-9 moles of ethylene oxide) | <2 |
| SURFONIC (a trademark of Texaco) Corporation) L 24-7 (nonionic surfactant ethoxylated linear alcohol 6-7 moles of ethylene oxide) | <2 |
| Sodium Borate (Potassium Borate tetrahydrate) | 2-3 |
| Citric Acid (ascorbic acid) | 0.1-0.5 |
| Lactic Acid | 0.1-1 |
| Tripolyphosphate (Sodium Tri basic phosphate or monobasic or dibasic phosphate) | <2 |
| Monosodium Glutamate or Urea | 1-2 |

*Water can be added all at once or ~33% at the start of mixing of the other components and then add 50-55% more water.

These ingredients should be mixed slowly, particularly when adding the tripolyphosphate or lumps will collect. High speed agitation can cause foaming. Once this second mixture is thoroughly mixed, the fermentation product can be added and mixed to form the final enzymatic product. The density should be about 1.04 g/cc and a pH ~ 7.4-7.6.

The above formulation has some of the components present in an enzymatic composition set forth in U.S. Pat. No. 3,635,797 which is incorporated by reference herein. Although there are some compositional similarities, there are key distinctions which give rise to greatly enhanced effectiveness in biodegradation of oil on water as illustrated in the data of the examples. In particular, excellent improvement is obtained when using the low levels of monosodium glutamate. The activity of the instant product is much greater than in the '797 patent, while not requiring the use of any type of catalyst, such as the magnesium salt present in the 3 797 patent. The two surfactants used in the above described composition are believed to perform two functions, but this explanation does not limit the scope of the invention. The TERGITOL surfactants act to disperse and break down oil on water, while the SURFONIC surfactants act as carriers for biological media which attach to and biodegrade the oil. In the preferred form of the invention, both these types of surfactants, or their equivalent, are present.

EXAMPLES

By way of illustration and without limitation, the following examples illustrate preparation and testing of a number of varying embodiments of the inventions.

EXAMPLE 1

A fermentation product was prepared using the following ingredients:

| Ingredients | Weight (g) |
| --- | --- |
| water (soft, tap water) | 669 |
| dark molasses (Brer Rabbit) | 56 |
| Tubinado sugar (unrefined) | 16.8 |
| malt (barley) | 7.65 |
| Brewer's Yeast | 0.83 |

The water and dark molasses were stirred to form a uniform solution and then mixed thoroughly with the remaining ingredients. The mixture had a pH of about 5.7, and the mixture was stored at room temperature (75° F.) in a dark cabinet. Fermentation was observed to be occurring the next day, and the solution was a dark brown color. The samples was occassionally stirred, and fermentation was completed ten days later. The finished product had an alcohol content of 44.9 g/l or 5.69% by volume.

EXAMPLE 2

This fermentation product was prepared in the same manner as Example 1, but Fleischmann's "fresh active" Yeast Cake (wet cake) was substituted for Brewer's Yeast. The mixture had an initial pH of 5.65 and 4.3 once fermentation was complete. The alcohol content was 45.5 g/l or 5.77% by volume.

EXAMPLE 3

This fermentation product was prepared in the same manner as Example 1, but Fleischmann's Baker's Yeast Dry pak was substituted for Brewer's Yeast. The mixture had an initial pH of 5.65. The alcohol content was 54.2 g/l or 6.86% by volume. The alcohol yield using the Baker's Yeast was the best of the three examples using different yeasts. Such increased alcohol content provided enhance wettability of oil by the final enzymatic product (i.e., lowered surface tension for the product). This property allows increased penetration of the active enzymatic product and thus increased reactivity, particularly with oil on the surface of water.

EXAMPLE 4

A variety of other enzymatic compositions for accelerating biodegradation were made using the following ingredients and conditions; the first group ("Fermentation Portion") is the starting fermentation type product with various types described in Examples 1-3, and the second group ("Emulsified Portion") is the emulsifier or enzymatic mixture to be combined with the fermentation product to produce a bioremediation enzymatic treatment composition:

| | Sample | | |
| --- | --- | --- | --- |
| Fermentation Portion | (a) | (b) | (c) |
| Ingredient | wt. (g) | wt. (g) | wt. (g) |
| water (hot, soft tap) | 669 | 699 | 669 |
| molasses (Brer Rabbit) | 56 | 56 | 56 |
| Stir and dissolve the molasses in the water | | | |
| Turbinado Sugar | 16.2 | 16.2 | 16.2 |
| Malt (barley) | 7.65 | 7.65 | 7.65 |
| Baker's Yeast (wet cake) | 0.83 | — | — |
| Baker's Yeast (dry) | — | — | 0.83 |
| Brewer's Yeast | — | 0.83 | |

These mixtures were fermented for 5 days at room temperature with the resulting final pH values: (a) 4.1, (b) 5.6 and (c) 4.3.

| | Sample | | |
| --- | --- | --- | --- |
| Emulsified Portion | (a) | (b) | (c) |
| Ingredient | wt. (g) | wt. (g) | wt. (g) |
| water (soft, tap) | 668 | — | |
| Surfonic -24-7 (Texaco, Inc.) | 40.5 | 60.0 | — |
| Surfonic -24-9 (Texaco, Inc.) | — | 54.0 | 40.5 |
| Tergitol -15-S-7 (Union Carbide) | 36.2 | — | — |
| Tergitol -15-S-9 (Union Carbide) | — | — | 36.2 |
| Sodiuam Borate | 51.8 | 77.0 | 51.8 |
| Citric Acid | 43.5 | 5.2 | 67.5 |
| Lactic Acid | 19.0 | 28.0 | 19.0 |
| Urea | 126 | 126 | 126 |
| water (after mixing all above) | 1147 | 1147 | 1147 |
| Total Weight | 2882 g | 2860 g | 2906 g |

EXAMPLE 5

A subsequent specimen like Example 4 (c) was prepared but with the substitution of monosodium glutamate for urea. This specimen was also evaluated for performance of accelerating biodegradation of oil in water. Results of these tests will be provided hereinafter (see Example 7, data cited as "Modified Product").

EXAMPLE 6

A fermentation product was prepared using the following ingredients:

| Ingredients | Weight (lb.) | Weight % |
| --- | --- | --- |
| water (deionized) | 11,161 | 89.26 |
| molasses (dark) | 935 | 7.47 |
| turbinado sugar (unrefined) | 280 | 2.24 |
| malt (barley) | 128 | 1.02 |
| Yeast (baker's dry) | 14 | 0.11 |

The ingredients are mixed at a moderate speed, and the yeast can be predissolved in warm water and then added to the mixture. The fermentation process should be completed by 5-7 days depending on the ambient temperature. The product was prepared using deionized water which does not contain minerals that would retard fermentation and consequently reduce the desired, high alcohol levels and enzyme quality. Conventional softened water can also usually be used in place of deionized water, assuming there are none of the undesirable minerals in the water.

The above described fermentation product can be used independently as a soil bioremediation product or as part of a two component enyzmatic composition prepared with the following ingredients and conditions:

| Ingredients | Weight (lb.) | Weight % (before combination w/fermentation product) |
|---|---|---|
| water (deionized) | 3011 | 31.32 |
| tergitol 15-5-9 (or equivalent) | 183 | 1.9 |
| surfonic L-24-7 (or equivalent) | 163 | 1.7 |
| sodium borate (borox decahydrate 30/100) | 234 | 2.43 |
| citric acid | 16 | 0.17 |
| lactic acid (80%) (1.198 sp. gn) | 86 | 0.89 |
| tripolyphosphate | 182 | 1.89 |
| monosodium glutamate | 570 | 5.93 |
| water (deionized) | 5172 | 53.8 |

These ingredients should be mixed slowly with the water which can be added all at one time or in two parts: one can add the 31% at the beginning and 54% after mixing in all the other ingredients. The final mixture of the fermentation product and the emulsifier portion will have a specific gravity of 1.038 and a pH of about 7.4-7.6. This product using monosodium glutamate (MSG) is preferred over the use of urea. Performance increases substantially when roughly 2% of MSG is present in the final combined mixture.

EXAMPLE 7

This example illustrates the results obtained concerning the effectiveness of the instant product versus a prior art material in converting hexadecane to $CO_2$:

| Sample | Mineral Nutrients in nature (no enzyme composition) (EC) | Mineral Nutrients in nature 1/50 (ECU)* | Mineral Nutrients in nature 1/500 (ECU)* | Mineral Nutrients in nature 1/1000 (ECU)* | Mineral Nutrients in nature 1/50 Modified Product+ (3) | Mineral Nutrients in nature 1/500 Modified Product+ | Mineral Nutrients in nature 1/1000 Modified Product+ | Mineral Nutrients in nature 1/10 Modified Product+ Autoclaved |
|---|---|---|---|---|---|---|---|---|
| Hexadecane Transformation (Z transformed to CO2) Mean of 3 trials | 16 | 3.1 | 6.3 | 6.7 | 19.3 | 50 | 43.7 | 0 |
| | | | | | Need more time so bacteria can use up mollases & convert to Hydrocarbon | 300 increase proven efficacy | | |
| | | | | | | Should totally eliminate Hydrocarbons | | |

Mineralization of Hexadecane by a Microbiol Consortium From Prince William Sound, Alaska (1)

(1) Consortium was in incubated for 70 hours with 100 ug of labeled hexadecane per 10 ml sample.
*See Example 4 for composition.
+See Example 5 or 6 for composition.

Note the vast improvement in results for the inventive product over the prior art enzyme composition (similar to the formulation in U.S. Pat. No. 3,635,797).

EXAMPLE 8

A test of the bioremediation performance of an enzymatic composition of the invention for petroleum hydrocarbon in soil was performed by the Northern Testing Laboratories Inc., Fairbanks, Ak. A pretreatment EPA 418.1 determination was done in duplicate, using approximately 15 grams of soil per sample. Pretreatment levels were found to be 737 and 603 mg/dry kg.

The measurement for the soils were conducted by volume since the treatment instuctions are based on soil volume. Five hundred milliliters of soil were divided into two portions of 250 ml each, for treatment and control. Each portion was spread evenly in the bottom of a clean, freon-rinsed 2000-ml beaker, forming a layer approximately two centimeters deep. Seven milliliters of product were diluted to 700 ml with deionized water.

The treatment consisted of three applications (approximately 233 ml each) of diluted product at approximately 48-hour intervals. The liquid was simply poured over the top of the soil layer. At the time of each application, the control portion received 233 ml of deionized water. Between treatments, the beakers were covered tightly with aluminum foil and held at approximately 62 degrees Fahrenheit.

Treatment 1: Friday March 9 at 5:00 p.m.
Treatment 2: Sunday March 11 at 2:00 p.m.
Treatment 3: Tuesday March 13 at 4:45 p.m.

The treatment ended Thursday March 15 at 7:00 p.m. when the treated and control soils were drained. On Friday March 16, samples of approximately 15 grams were taken from each portion and analyzed for TPH, yielding the following results:

Control sample: 767 mg/dry kg
Treated sample: 391 mg/dry kg.

Listed below are quality control assurance reference samples with a known concentration prior to analysis. The acceptable limits represent a 95% confidence interval established by the Environmental Protection Agency or by our laboratory through repetitive analyses of the reference sample. The reference samples indicated below were analyzed at the same time as your sample, ensuring the accuracy of your results.

A quality control test was also performed to insure accuracy of the aforementioned test.

| Sample # | Parameter | Unit | Result | Acceptable Limit |
|---|---|---|---|---|
| EPA 379-1 | Oil & Grease | mg/l | 19.1 | 16.6–23.4 |

EXAMPLE 9

Further performance tests were carried out by Chemical Analysis, Inc. to determine the effectiveness of the OSE (Example 6 enzymatic composition) to biodegrade a petroleum, hydrocarbon material known as BETX solution:

| Solution I: BETX | |
|---|---|
| COMPONENTS | % BY VOLUME |
| Benzene | 5.0 |
| Ethylbenzene | 5.0 |
| Toluene | 5.0 |
| Xylene | 5.0 |
| Florida Sea Water | 80.0 |
| TOTAL | 100.0% |

| Solution II: OSE-Florida Sea Water | |
|---|---|
| COMPONENTS | % BY VOLUME |
| Oil Spill Water | 0.20 |
| Florida Sea Water | 99.80 |
| TOTAL | 100.00% |

The percentage ratio of these two components represents a 1 to 500 mix ratio respectively.

| Solution III: BETX/OSE-Florida Sea Water | |
|---|---|
| COMPONENTS | % BY VOLUME |
| Solution I | 50.0 |
| Solution II | 50.0 |
| TOTAL | 100.0% |

| Solution IV: BETX/OSE-Florida Sea Water Solution | |
|---|---|
| COMPONENTS | % BY VOLUME |
| Solution III | 50.0 |
| Florida Sea Water | 50.0 |
| TOTAL | 100.0% |

| Final Solution Composition: | |
|---|---|
| COMPONENTS | % BY VOLUME |
| Aromatics | 5.0 |
| OSE Additive | 0.05 (1:2000 Weight Ratio) |
| Florida Sea Water | 94.95 |
| TOTAL | 100.00% |

The final solution identifies the composition of the final mixture when the various solutions are prepared and mixed together based on the procedural instructions. The resultant final solution was allowed to stir for a period of (63) hours and the volume of BETX aromatic content was evaluated. The initial percent volume of aromatic discontinuous phase in the final solution represented five percent after the test. As a result of the evaluation, it was observed that 1.6% of the BETX solution had been degraded of the discontinuous aromatic phase; this represented a 32% volume reduction in the aromatic content. Turbidity was observed to have increased in the water phase which indicated that incompatable components were incorporated into the water phase.

The 1:2000 weight ratio concentration of OSE in the final solution is based on the assumption that the OSE additive is 100% active; if the OSE is less than 100% active, then one needs to porportionate the concentration accordingly.

EXAMPLE 10

An additional test of the ability to reduce total petroleum hydrocarbon (TPH) was performed by the Savannah Laboratories and Environmental Services, Inc.

| Extraction No. | Time (d) | TPH mg(l) |
|---|---|---|
| 0 | 0 | 100,000 |
| 2 | 2 | 6,800 (uncorrected .-*48,000) |
| 4 | 12 | 5,300 |
| 6 | 19 | 900 |
| 7 | 23 | 150 |

*corrected for dilution

EXAMPLE 11

Respirocity test were performed by Chemical Analysis, Inc., Irving, Tex. The enzymatic composition (see, for example Example 6) analyzed was used in two different concentrations, 1/100 and 1/500 in solution. The concentration of the oil was 1,000 parts per million. The general effect on decreasing the aliphatic context of the oil was in the range of 80% and the decrease of the aromatic context was in the range of 40%. An additive concentration of about 1/500 appears to be substantially effective as 1/100. The effect of oxygen takeup was observed to be 178 mg/L for the enzymatic composition at 1/500 concentration, and 12 for seawater and 8 for oil. The net effect of the enzymatic composition was 512 mg/l. Below are listed the tabulated results:

| Oil Spill Eater (OSE) Respirocity Results* (See Example 6 composition) | | | | | | | | | | | | | | | |
|---|---|---|---|---|---|---|---|---|---|---|---|---|---|---|---|
| | | | | Accumulated Oxygen Uptake | | | | Aliphatic Content | | | | Aromatic Content | | Percent | Percent |
| Sample | Oil | Additive | Seawater | 0 mg/L | 10 mg/L | 20 mg/L | 30 days mg/L | 0 ppm | 10 ppm | 20 ppm | 30 days ppm | 0 ppm | 30 days ppm | Aliphatic Decrease | Aromatic Decrease |
| 1 | + | 1/500 | + | 16 | 380 | 620 | 690 | 712 | 570 | 233 | 151 | 246 | 133 | 79 | 46 |

-continued

| | | | | Oil Spill Eater (OSE) Respirocity Results* (See Example 6 composition) | | | | | | | | | | | |
|---|---|---|---|---|---|---|---|---|---|---|---|---|---|---|---|
| | | | | Accumulated Oxygen Uptake | | | | Aliphatic Content | | | | Aromatic Content | | Percent | Percent |
| Sample | Oil | Additive | Seawater | 0 mg/L | 10 mg/L | 20 mg/L | 30 days mg/L | 0 ppm | 10 ppm | 20 ppm | 30 days ppm | 0 ppm | 30 days ppm | Aliphatic Decrease | Aromatic Decrease |
| 2 | + | 1/500 | + | 18 | 410 | 660 | 730 | 693 | 542 | 274 | 138 | 240 | 149 | 80 | 38 |
| 3 | — | 1/500 | + | 5 | 152 | 174 | 186 | — | — | — | — | — | — | — | — |
| 4 | — | 1/500 | + | 5 | 141 | 168 | 194 | — | — | — | — | — | — | — | — |
| 5 | — | — | + | 0 | 5 | 8 | 21 | — | — | — | — | — | — | — | — |
| 6 | — | — | + | 0 | 6 | 8 | 11 | — | — | — | — | — | — | — | — |
| 7 | + | — | + | 2 | 12 | 18 | 22 | 705 | 710 | 695 | 682 | 251 | 248 | 3 | 1 |
| 8 | + | — | + | 3 | 13 | 16 | 19 | 684 | 680 | 681 | 675 | 238 | 237 | 1 | 0 |
| 9 | + | 1/100 | + | 26 | 460 | 680 | 770 | 690 | 512 | 210 | 105 | 245 | 115 | 85 | 53 |
| 10 | + | 1/100 | + | 33 | 520 | 740 | 810 | 695 | 486 | 260 | 89 | 250 | 127 | 87 | 49 |

Oil Spill Eater Batch No. 124-E

EXAMPLE 12

Detailed tests were also performed on the effect of the inventive enzymatic composition on mysid organisms using the procedures recommended by the U.S. Environmental Protection Agency. The test was conducted at a temperatures of 20° to 26° C. with five concentrations of test composition and a dilution water control. The five concentrations used were: 0 mg/L, 1 mg/L, 10 mg/L, 100 mg/L, 1,000 mg/L and 10,000 mg/L. The test results are shown in the table below:

| | Survival Data From Toxicity Tests | | | | | | | | | |
|---|---|---|---|---|---|---|---|---|---|---|
| Nominal | | Number Alive | | | | | Number Affected | | | |
| Concentration (mg/L) | 0 hr | 24 hr | 48 hr | 72 hr | 96 hr | 0 hr | 24 hr | 48 hr | 72 hr | 96 hr |
| 0 (control) | 1 | 10 | 10 | 10 | 10 | 0 | 0 | 0 | 0 | 0 |
| 1 | 1 | 10 | 10 | 9 | 9 | 9 | 0 | 0 | 0 | 0 |
| 10 | 1 | 10 | 10 | 9 | 9 | 9 | 0 | 0 | 0 | 0 |
| 100 | 1 | 10 | 10 | 10 | 9 | 9 | 0 | 0 | 0 | 0 |
| 1,000 | 1 | 10 | 9 | 9 | 8 | 8 | 0 | 0 | 0 | 0 |
| 10,000 | 1 | 10 | 0 | 0 | 0 | 0 | 0 | — | — | — |

While preferred embodiments of the invention have been shown and described, it will be clear to those skilled in the art that various changes and modifications can be made without departing from the invention in its broader aspects as set forth in the claims provided hereinafter.

I claim:

1. A chemical product for accelerated biodegradation of petroleum on water consisting of a two component mixture:

a first component being a fermentation component and a second component being an emulsifier component having a surfactant therein;

said fermentation component consisting of about 85-92% by weight water, about 5-9% by weight unrefined sugar, about 1.5% by weight malt and about 0.2% by weight yeast;

said emulsifier component consisting of about 83-88% by weight water, about 2% by weight of a surfactant selected from the group consisting of nonionic ethoxylated secondary alcohol with ethylene oxide and a nonionic ethoxylated linear alcohol with ethylene oxide, about 2-3% sodium borate, 0.1-0.5% by weight citric acid, 0.1-1% by weight lactic acid, about 2% by weight tripolyphosphate and about 1-2% by weight of monosodium glutamate.

* * * * *